United States Patent
Barsukov et al.

(10) Patent No.: US 6,660,434 B2
(45) Date of Patent: Dec. 9, 2003

(54) ENGINEERED CARBONACEOUS MATERIALS AND POWER SOURCES USING THESE MATERIALS

(75) Inventors: Igor V. Barsukov, Glenview, IL (US); Peter L. Zaleski, Willowsprings, IL (US); David J. Derwin, Prospect Heights, IL (US); Richard J. Girkant, Lansing, IL (US); Maritza Gallego, Chicago, IL (US)

(73) Assignee: Superior Graphite Co., Chicago, IL (US)

( * ) Notice: Subject to any disclaimer, the term of this patent is extended or adjusted under 35 U.S.C. 154(b) by 79 days.

(21) Appl. No.: 09/800,260

(22) Filed: Mar. 6, 2001

(65) Prior Publication Data

US 2001/0041293 A1 Nov. 15, 2001

Related U.S. Application Data

(60) Provisional application No. 60/187,306, filed on Mar. 6, 2000.

(51) Int. Cl.[7] .......................... H01M 4/62; H01M 4/50; C01B 31/04
(52) U.S. Cl. ................. 429/232; 429/224; 429/215; 423/448; 29/623.1
(58) Field of Search ................... 429/212, 215, 429/224, 231.8, 232; 29/623.1; 423/448

(56) References Cited

U.S. PATENT DOCUMENTS

| 5,270,128 A | 12/1993 | Reichert et al. |
|---|---|---|
| 5,339,024 A | 8/1994 | Kuo et al. |
| 5,447,809 A | 9/1995 | Hafner et al. |
| 5,482,798 A | 1/1996 | Mototani et al. |
| 5,489,493 A | 2/1996 | Urry |
| 5,895,734 A | 4/1999 | Nardi et al. |
| 5,919,588 A | 7/1999 | Jose et al. |
| 5,938,798 A | * 8/1999 | Hanawa et al. ............. 29/623.1 |
| 5,985,452 A | * 11/1999 | Mercuri ...................... 428/408 |
| 6,171,724 B1 | * 1/2001 | Li et al. ...................... 429/217 |
| 6,451,486 B1 | * 9/2002 | Davis et al. ................. 429/232 |

FOREIGN PATENT DOCUMENTS

| JP | 56-102075 | * 8/1981 |
|---|---|---|
| WO | WO 99/34673 | 7/1999 |
| WO | WO 99/46437 | 9/1999 |
| WO | WO 01/84652 A2 | 11/2001 |

OTHER PUBLICATIONS

Boucher, Michel A. Graphite, Canadian Minerals Yearbook, 1994 (no month). (pp. 24.1–24.9).*
Hawley's Condensed Chemical Dictionary, 11th ed. p. 73. 1987 (no month).*

* cited by examiner

Primary Examiner—Patrick Ryan
Assistant Examiner—Tracy Dove
(74) Attorney, Agent, or Firm—Cook, Alex, McFarron, Manzo, Cummings & Mehler, Ltd.

(57) ABSTRACT

An engineered carbonaceous material (ECM) comprising a mixture of synthetic graphite and one or more other graphite, such as natural flake graphite, natural vein graphite, and/or amorphous graphite. The objects are also achieved by an ECM comprising a mixture of expanded graphite and one or more other graphite materials, such as natural flake graphite, natural vein graphite, amorphous graphite and/or synthetic graphite. The ECM is preferably mixed with 0.01 to 20.0 wt. % $MnO_2$ to create a battery active material. The mixtures may be made by either co-blending or co-grinding the graphites together. An electrochemical cell incorporating the material is also contemplated.

12 Claims, 2 Drawing Sheets

ENGINEERED CARBONACEOUS MATERIALS AND POWER SOURCES USING THESE MATERIALS

CROSS-REFERENCE TO RELATED APPLICATION

This application claims the benefit of the filing date of provisional application Ser. No. 60/187,306, filed Mar. 6, 2000.

BACKGROUND OF THE INVENTION

The present invention relates to improvements in batteries and, more particularly, to a carbonaceous additive for batteries to be combined with the active battery material to improve the service performance of the battery.

Carbon additives are used in many types of batteries (e.g., alkaline, lithium primary, lithium ion, lithium polymer, and rechargeable lead-acid batteries) to enhance the conductivity of the active material. For example, in a typical alkaline battery, the cathode includes manganese dioxide ($MnO_2$) particles as an active material in combination with graphite, potassium hydroxide (KOH) solution, and deionized water. The $MnO_2$ formed by electrolysis (commonly called electrolytic manganese dioxide or EMD) has an extremely low of specific conductivity, so graphite is added to enhance the electrical conductivity, both between the $MnO_2$ particles and between the cathode and the steel can forming the battery. (See, e.g., U.S. Pat. No. 5,489,493 to Urry, which discloses the use of synthetic or natural graphite as the "conductor" in the cathode.)

Various graphite additives have been proposed for enhancing this service performance of batteries. For example, U.S. Pat. No. 5,482,798 to Mototani, et al. disclose the use of expanded graphite particles having an average particle size in the range from 0.5 to 15 mm, the expanded graphite comprising between 2 to 8 wt % of the solids in the mixed cathode active material. Synthetic or artificial graphite is preferred by Mototani, et al. because of its lower level of impurities, such as iron. See also, International Publication WO 99/34673, which discloses an electrochemical cell in which the cathode includes expanded graphite particles having an average particle size between 17 to 32 mm and having kerosene absorption value in the range of 2.2 to 3.5 ml/g. The surface area to mass ratio, tap density, Scott density, and the purity level of the expanded graphite are also specified. An expanded graphite having these characteristics, and the method of producing such an expanded graphite art, are disclosed in the co-pending applications Ser. No. 09/253,957, filed Feb. 22, 1999, now U.S. Pat. No. 6,287,694, incorporated by reference herein, and having the same assignee as the present application.

While the use of such expanded graphite additives resulted in impressive improvements in the service performance of electrochemical cells, further improvements in battery service performance within the bounds of economic feasibility are always desirable.

Thus, it is the principal object of the present invention to provide for the improved service performance of electrochemical cells.

More particularly, it is the object of the present invention to provide a carbonaceous material to be mixed with the active material in the formation of the cathode for a battery.

SUMMARY OF THE INVENTION

These objects, as well as other that will become apparent upon reference to the following detailed description and accompanying drawings, are achieved by an engineered carbonaceous material (ECM) comprising a mixture of synthetic graphite and one or more other graphite, such as natural flake graphite, natural vein graphite, and/or amorphous graphite. The objects are also achieved by an ECM comprising a mixture of expanded graphite and one or more other graphite materials, such as natural flake graphite, natural vein graphite, amorphous graphite and/or synthetic graphite, in which the carbonaceous material has a purity of between 90.0 and 99.9% C (based on LOI). The ECM is preferably mixed with 0.01 to 20.0 wt % $MnO_2$ to create a battery active material. The mixtures may be made by either co-blending or co-grinding the graphites together. The mixtures may contain between 0.1 and 99.9 wt % synthetic graphite and may be further combined with from between and including 92.0–95.2 $MnO_2$. An electrochemical cell incorporating the material is also contemplated.

DETAILED DESCRIPTION

Figure 1:
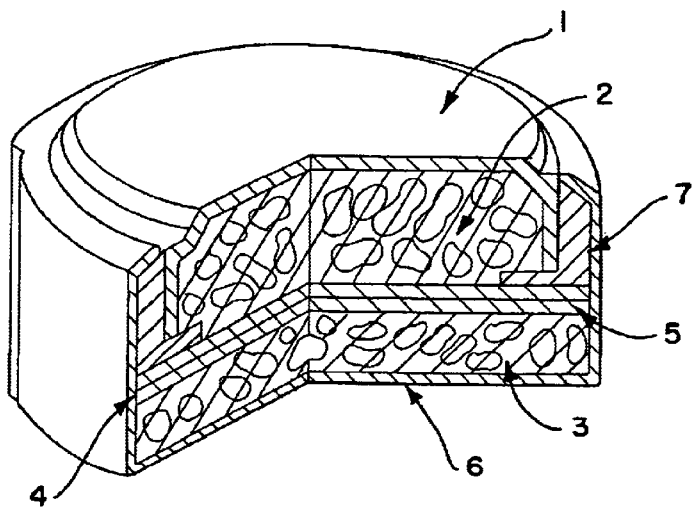
FIG. 1 is a perspective view of an electrochemical cell, in partial cross section, of the type incorporating a graphite material according to the present invention.

There are few requirements to the conductive graphites for alkaline batteries. Purity is one of them. Low purity material may contain some battery "poisons", which usually act as catalysts for side reactions that lead to gassing and increased self-discharge of the battery. Another requirement for the conductive additives is to have maximized "connectivity" properties. "Connectivity" is an indication of how well and uniformly the particles of the active material, binder, conductive additive and any other additives to the electrode matrix are interconnected with each other. If connectivity is poor, some parts of an electrode made of such material will be excluded from the electrochemical process, resulting in reduced overall battery performance.

In order to promote connectivity, battery manufacturers often use high shear mixers. However, the use of such mixers only partially solves the connectivity problem due to the fact that these are typically batch and/or semi-continuous mixers and are used to mix quite large batches of materials. Those skilled in batch processing techniques may know that uniform distribution of a tiny percentage (typically<8 wt %) of the low density finely sized carbon between the coarser particles of much higher density active material represents a very complex task.

In accordance with the present invention, a series of composite graphite materials are provided which have been found to offer better connectivity of the components of electrodes, and, consequently an increase in the conductivity of electrode matrixes, resulting in the significant improvement of battery performance.

An example of the composite graphite materials is either the product of blending or co-grinding (simultaneous grinding of two materials in one mill) of two or more types of graphite, namely, natural and synthetic or synthetic and expanded. Another example of the composite material is a blend or a co-processed material, which contains expanded graphite and some EMD. It has been found that for all practical concentrations of carbonaceous materials in the negative electrodes of the primary alkaline Zinc-manganese dioxide batteries (4–10 wt %), composite materials work better than individual ingredients of the subject composite materials provided in the same concentrations in the electrodes.

Further, some of the subject composite materials feature improved lubricious properties, which may offer significant reduction of the electrode fabrication costs. Thus, it has been determined that the tool wear in the high shear mixers, as well as in the electrode molding machines, may be dramatically reduced when one switches to using EMD and a composite graphite comprising the expanded and some natural purified graphite.

In order to quantitatively prove the above observations, a series of electrode conductivity/resistivity tests, as well as tests of the electrochemical cells, have been conducted. The lubricious properties of materials have been checked by several methods, one of which is described in the examples that follow.

The resistivity test was conducted in compliance with well known lab testing procedures. According to this procedure, a specific size fraction and volume of sample, which is a dry blend of EMD and carbon at the desired ratio, is confined under load of 10,000 psi in a non-conductive cylindrical mold by two metal electrodes. Unidirectional resistance is measured between these electrodes using a Kelvin bridge. Resistivity is calculated and reported in Ohm-inches. The resistivity values have been also reported in Ohm-cm in this application. The electrochemical cells of the alkaline Zinc-manganese dioxide system (LR2016 size) have also been manufactured and tested.

The typical electrochemical device used for testing was a coin cell of a standard 2016 size (20 mm diameter and 1.6 mm high). The stainless steel housing for such cells is available from Hoshen, a Japanese corporation. FIG. 1 schematically represents the cutaway view of the cell. The construction of such cells is well known.

The battery shown on FIG. 1 consists of the following main components. Stainless steel anode cup (1), cathode cup (6) and a nylon gasket (7) represent a housing of the battery. The interior of the cathode cup is airbrushed with graphite-containing can coating (4). Such coating, for instance, is available from the Superior Graphite Co. of Chicago, Ill., and is called "Formula 39A". The cathode (3) consists of the active material, EMD. An example of such material is AB—standard alkaline battery grade available from Kerr McGee. For the electrochemical data reported in this application, the amount of EMD in the cathodes was either 0.35 g or 0.3 g. A graphite powder is added to the EMD for conductivity enhancement. The amount of graphite depends on the purpose of the test. In this application, data is reported for EMD/Carbon ratios of 11.5/1 and 20/1. The wet cathode mix (impregnated with electrolyte, 31 wt % or 37 wt % KOH) is pressed into the dried cathode cup. The pressure is applied by a semi-automatic hydraulic press (available from Carver, Inc.). A pressure of about 4,210 lbs/cm$^2$ is applied for 30 seconds to form the cathode pellet. The final electrode thickness is monitored and controlled as a measure of density of the electrode. Two layers of the Zr cloth separator (5) (available from ZirCar), is placed between the cathode (3) and anode (2). As an alternative, two layers of the non-woven separator may be used. The separator is impregnated with KOH electrolyte prior to placing it in the battery. The anode (2) is based on a Zinc powder, available from Doral Distribution (grade: Zinc Doralloy 104<0.036 mm). Its amount is equal to the amount of EMD in the counter electrode. The anode paste is also impregnated with KOH electrolyte prior to assembling of the cell. The battery is sealed by the means of a crimping device (also available from Hoshen Corp.).

Up to twenty cells of each formula were made. Freshly made cells were discharged using a multi-channel battery cycler (for instance, a 16-channel model available from Arbin Instruments). The current densities applied to the cells are described in detail in the examples.

Although the majority of the tests describe the performance of the engineered graphites in alkaline Zinc-Manganese dioxide primary batteries, it is believed that similar increased performance of other batteries using the materials under consideration will hold true. This assumption is due, in part, to existing similarities for the conductivity enhancement mechanisms, which are known for many other battery systems. In particular, ECMs are expected to work more efficiently than other conventional graphites in the zinc-air "hearing aid" primary batteries, Li-Ion and Li-Ion polymer secondary batteries, industrial nickel cadmium rechargeable batteries, reserve cells, electrochemical ultracapacitors, fuel cells, etc.

EXAMPLE 1

A resistivity test, whose description is given above, has been carried out with commercial EMD (AB standard grade, available from Kerr-McGee) and a number of graphite products. The EMD to Carbon ratio in the pellets was kept very close to the ratios which are being used in commercial battery electrodes. Specifically, two ratios of EMD to Carbon were used: 13.3:1 and 11.5:1. Those correspond to 7 wt % and 8 wt % of the graphite, respectively.

The type of the graphitic additive was the variable of the tests. The graphites have been as follows:

(a) A mechanical blend of purified synthetic graphite 5535APH (a purified (synthetic) commercial grade graphite available from the Superior Graphite Co.) in the amount of 40 wt % with purified natural crystalline flake graphite 2935APH (another commercial grade available from the Superior Graphite Co.) in the amount of 60 wt %. This blend has been obtained by the means of V-blending using standard production equipment. (2935APH is purified natural crystalline flake graphite that has been hot air pancake milled down in size to have a d90 of less than 20 microns. In general, the distribution is 90% less than 20 microns, 50% less than 9.5 microns and 10% less than 4.5 microns.)

(b) A product of simultaneous grinding in the same mill ("co-grinding") of a precursor material to make 5535APH (40 wt %) and a precursor material to make 2935APH (60 wt %). The milling has been accomplished in a flat-configured production size jet mill by the means of feeding of a blend of two corresponding precursor materials of the controlled ratio. (5535APH is a purified (synthetic) graphite that has been hot air pancake milled down in size to have a d90 of less than 20 microns. In general, the distribution is 90% less than 20 microns, 50% less than 8.5 microns, and 10% less than 3.5 microns.)

(c) A mechanical blend of 5535APH in the amount of 50 wt % with 2935APH in the amount of 50 wt %. This blend has been obtained by the means of V-blending using standard production equipment.

(d) A product of simultaneous grinding in the same mill ("co-grinding") of a precursor material to make 5535APH (50 wt %) and a precursor material to make 2935APH (50 wt %). The milling has been accomplished in a flat-configured production size jet mill by the means of feeding of a blend of two corresponding precursor materials of the controlled ratio.

(e) Pure 5535APH, used as a baseline;

(f) Pure 2935APH, used as a baseline;

(g) Synthetic graphite KS-44 (a commercial product of Timcal), used as a baseline.

Co-grinding was performed until the resultant ECM had uniform characteristics. This is determined by comparing the surface area, particle size, Scott volume, kerosene absorption, and resilience of three random samples.

Table 1 summarizes the data of the resistivity test, and shows that at the same concentration of graphite in the EMD, the resistivity of plain synthetic graphite 5535APH and plain natural graphite 2935APH are always higher than the resistivity values of blends and, especially, co-grinds of these materials. Namely, the electrode resistivity is about three times lower than the baseline for the blends and about an order of magnitude lower for the co-ground materials.

Table 1 also lists resistivity results of the synthetic graphite KS-44, which is an established grade for the conductivity enhancement of the alkaline battery cathodes. The data for KS-44 is provided for reference purposes only. It is noteworthy that, for instance, at 11.5/1 ratio of EMD/Carbon, the resistivity of a pellet having KS-44 is lower than the one having pure 2935APH or 5535APH. One can see that the resistivity of electrodes comprising engineered materials leads to equal or even more conductive EMD matrixes than the one having KS-44.

The fact of the lower resistivity of the electrodes that incorporate ECMs of the subject invention provides a preliminary indication that EMD matrix containing an ECM has a higher conductivity than the EMD matrix containing any pure ingredient comprising such an ECM. While the reason for the observed phenomenon is yet to be understood, it is believed that it is due to the increased "connectivity" of the co-processed graphite particles versus pure graphites.

The cathodes incorporated EMD (AB standard grade, available from Kerr McGee) and one of the engineered carbonaceous materials (ECM) in the ratio EMD/Carbon of 11.5/1. This ratio corresponds to 8 wt % of carbon content in the cathode. The procedure for the battery assembly is described above. The cells were impregnated with 37 wt % KOH. The cells were discharged from their OCV of 1.56V–1.61V (depending on an individual cell) to the cut-off voltage of 0.8V. A continuous current, which corresponded to 100 mA per 1 gram of EMD, was used. The capacity of the cells was monitored and compared. This discharge protocol was aimed to mimic an ANSI continuous discharge high drain battery test, according to which an alkaline Zinc-Manganese dioxide AA size battery (containing about 10 grams of EMD) is being discharged with 1A until the battery reaches the cut-off point of 0.9V.

Figure 2:
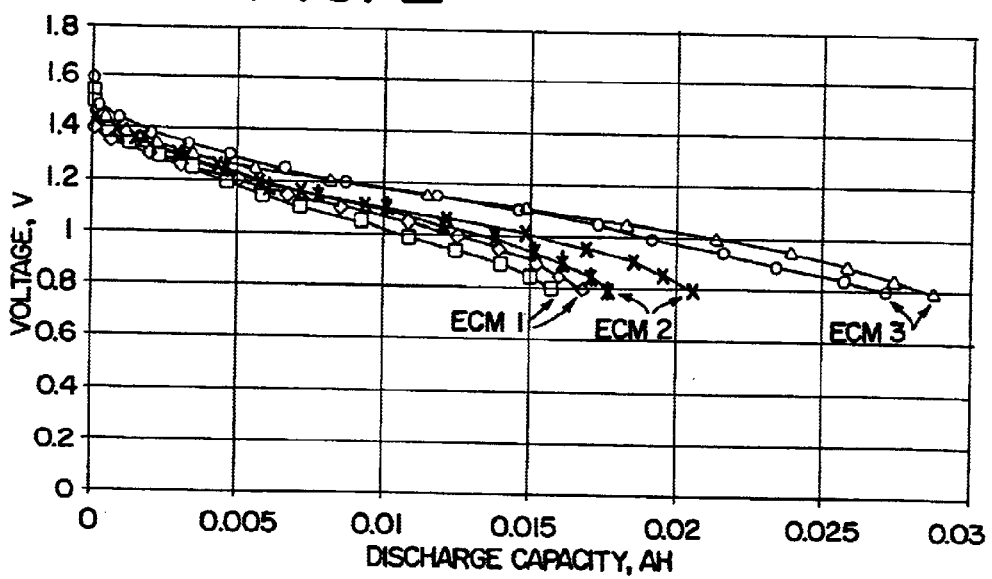
FIG. 2 is a graph of the galvanostatic discharge curves for electrochemical cells incorporating graphite materials according to the present invention.

FIG. 2 shows galvanostatic discharge curves for the alkaline batteries having three types of ECM. Graphitic additive marked ECM 1 was a product of co-processing of 2935APH (50 wt %) and 5535APH (50%). The additive marked ECM 2 was comprised of 2935APH (60 wt %) and 5535APH (40 wt %). The additive marked ECM 3 was a product of co-processing of the expanded purified crystalline flake graphite LBG-91 (a commercial grade available from Superior Graphite Co.) 10 wt % and 5535APH (90 wt %). (LBG-91 is a purified natural crystalline flake graphite that has been acid intercalated, expanded and pancake air milled down in size to have a d90 of 40–70 microns. In general, the distribution is 90% less than 60 microns, 50% less than 21 microns, and 10% less than 6 microns.)

Twenty cells containing each type of graphite were built and discharged for this test. The results were found to be highly reproducible. One or two cells out of twenty would turn out inconsistent with the others. FIG. 2 shows discharge curves for two most typical cells with each type of graphite. One may see that the cells incorporating ECM 1 achieved capacity, which covers the range of 16–17 mAh per cell 0.35 g of EMD (or up to 48.6 mAh/g of EMD). The cells incorporating ECM 2 reached slightly higher capacity of up to 21 mAh per cell (60 mAh/g of EMD). The increased performance of ECM 2 vs. ECM 1 during discharge is consistent with results obtained during the resistivity test, reported for these materials in Example 1 and Table 1.

TABLE 1

Electrical Resistivity for ECM Graphite vs. Baseline

| Resistivity/ Composition of Carbon Additive | Baseline Synthetic KS-44 Timcal | Synthetic 5535APH, Superior Graphite Co. | Natural 2935APH Superior Graphite Co. | Blend: 60 wt % 2935APH + 40 wt % 5535APH | Co-grind: 60 wt % 2935APH+ 40 wt % 5535APH | Blend: 50 wt % 2935 APH + 50 wt % 5535APH | Co-grind: 50 wt % 2935APH + 50 wt % 5535APH |
|---|---|---|---|---|---|---|---|
| Total amount of conductive additive in the EMD disc - 7 wt % (EMD/C ratio: 13.3:1) | | | | | | | |
| Resistivity, Ohm-inch | 29.1 | 16.9 | 8.44 | 4.91 | 1.51 | 4.07 | 1.48 |
| Resistivity, Ohm-cm | 0.12 | $6.6 \times 10^{-2}$ | $3.3 \times 10^{-2}$ | $1.9 \times 10^{-2}$ | $5.9 \times 10^{-3}$ | $1.6 \times 10^{-2}$ | $5.8 \times 10^{-3}$ |
| Total amount of conductive additive in the EMD disc - 8 wt % (EMD/C ratio: 11.5:1) | | | | | | | |
| Resistivity, Ohm-inch | 1.84 | 7.92 | 4.15 | 1.6 | 0.84 | 1.96 | 1.46 |
| Resistivity, Ohm-cm | $7.2 \times 10^{-3}$ | $3.1 \times 10^{-2}$ | $1.6 \times 10^{-2}$ | $6.4 \times 10^{-3}$ | $3.3 \times 10^{-3}$ | $7.7 \times 10^{-3}$ | $5.7 \times 10^{-3}$ |

EXAMPLE 2

A series of the alkaline Zinc-Manganese dioxide electrochemical cells of the standard size LR2016 were produced.

It should be noted that the electrochemical performance of the baseline synthetic graphite KS-44, is quite similar to that of batteries containing ECM 1 and ECM 2. Specifically, the discharge capacities attained on similarly made and tested LR2016 cells having KS-44 covered the range between 16–21 mAh per cell. The batteries having 5535APH reached capacities of up to 14 mAh per cell, and those having 2935APH did not exceed 11 mAh per cell. These results provide another indication that ECMs work better in the real battery electrode matrixes than the individual components of the ECMs under consideration.

FIG. 2 also shows galvanostatic discharge curves for the batteries having ECM 3 in their cathodes. It is evident that performance of these batteries exceeds those having just 5535APH and other types of graphite, which were tested in this experiment. This has to do with the fact that 10 wt % of highly conductive expanded graphite has been added to the matrix. In addition, it is believed that co-processing of 5535APH and expanded graphite, LBG-91, changed the graphite properties, thus increasing the connectivity of ingredients of the cathode. The discharge capacity for the battery having ECM 3 reached 28 mAh per cell (80 mAh/g of EMD).

EXAMPLE 3

A series of alkaline Zinc-manganese dioxide cells of LR2016 size were discharged from their OCV of 1.55–1.61 V to the cut-off voltage of 0.8 V. The current density was 100 mA per gram of EMD. This discharge regime roughly corresponds to the continuous discharge of a commercial AA size alkaline cell with the current of 1 A. The cut-off voltage for this test was 0.8V vs. Zn electrode.

Performance of two carbonaceous materials has been the subject of investigation in this test. Those are:
(a) LBG-91, a commercial grade of expanded purified flake graphite available from Superior Graphite Co;
(b) An ECM, which consists of LBG-91 (99.7 wt %) and 0.3 wt % of EMD (AB standard grade, available from Kerr McGee, that has been additionally finely sized to 99.8% passing 325 US mesh screen—less than 45 microns). This composite material is identified as ECM 4. (LBG-91 is a purified natural crystalline flake graphite that has been acid intercalated, expanded and pancake air milled down in size to have a d50 of 25.0 microns. In general, the distribution is 90% less than 60 microns, 50% less than 25 microns and 10% less than 6 microns.)

Co-blending was performed until the resultant mixture had a uniform purity, as determined by the LOI of the material. This typically occurred after about 5 minutes of tumbling the constituent materials together in a PK V-blender.

About twenty cells incorporating each of these two graphites were manufactured and tested. The ratio of active material to carbon was kept at 20:1. The amount of active material (EMD) in the cell was 0.3 g. ECM4 was considered as pure carbon in calculations of the ratios of electrode ingredients. The electrolyte for this test was 31 wt % KOH.

Figure 3:
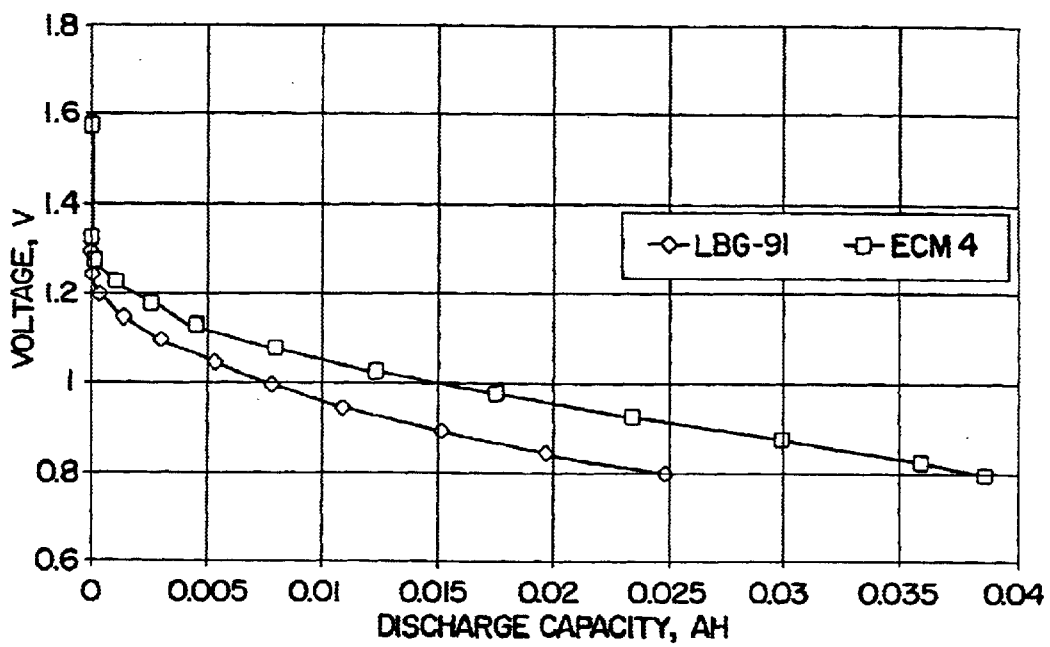
FIG. 3 is a graph showing typical galvanostatic discharge curves for electrochemical cells having further graphite materials according to the present invention.

The side-by-side comparison of the behavior of cells having LBG-91 and ECM 4 is shown on FIG. 3. The capacity demonstrated by a typical cell having LBG-91 was 25 mAh per cell (0.3 g EMD). This comes to 83.3 mAh per gram of EMD. The value of capacity, which has been achieved by a typical cell having ECM 4, reached 39 mAh per cell or 130 mAh per gram of EMD. It is believed that this results from the increased uniformity of the cathode mix, due to the fact that most active particles of EMD (<325 mesh) have been pre-dispersed in the bulk graphite prior to assembling of the battery. This may have provided better utilization of the cathode through the increased connectivity of its ingredients.

EXAMPLE 4

Currently, most advanced performance alkaline Zinc-Manganese dioxide batteries use expanded graphite as cathode conductivity additive. Its amount in the cathodes is typically reduced to below 6 wt % due to the fact of higher conductivity of such graphite. The delaminated sheet-like morphology of the expanded graphite, accompanied by the increase of EMD in the mixtures, causes significant tool wear issues, due to the high abrasiveness of the EMD.

The experiment reported below was designed to indirectly show the effect of the tool wear in the cathode mixing as well as electrode molding equipment.

A high shear mixer with a stainless steel "316" propeller was placed in an enclosed container which contained the following powders:
(a) EMD (standard alkaline battery grade available from Delta EMD);
(b) EMD with 6 wt % of the expanded purified flake graphite LBG-91 (a commercial grade available from Superior Graphite Co.);
(c) EMD with 6 wt % of the engineered carbonaceous material, identified here as ECM 5.

The ECM 5 is a product of co-processing of two grades of graphite: expanded (LBG-91) and natural purified crystalline flake graphite 2939AP, a commercial product available from Superior Graphite Co. The ratio of LBG-91/2939AP is 5/1.

By operating a mixer with a constant speed of about 1,000 rpm in the dry cathode powder, and monitoring the weight loss of the stainless steel propeller after certain intervals of time, it was determined that the mixture having the ECM 5 graphite had the maximum lubricious properties. The highest abrasion was encountered in the mix (a) having plain EMD. See FIG. 4.

Figure 4:
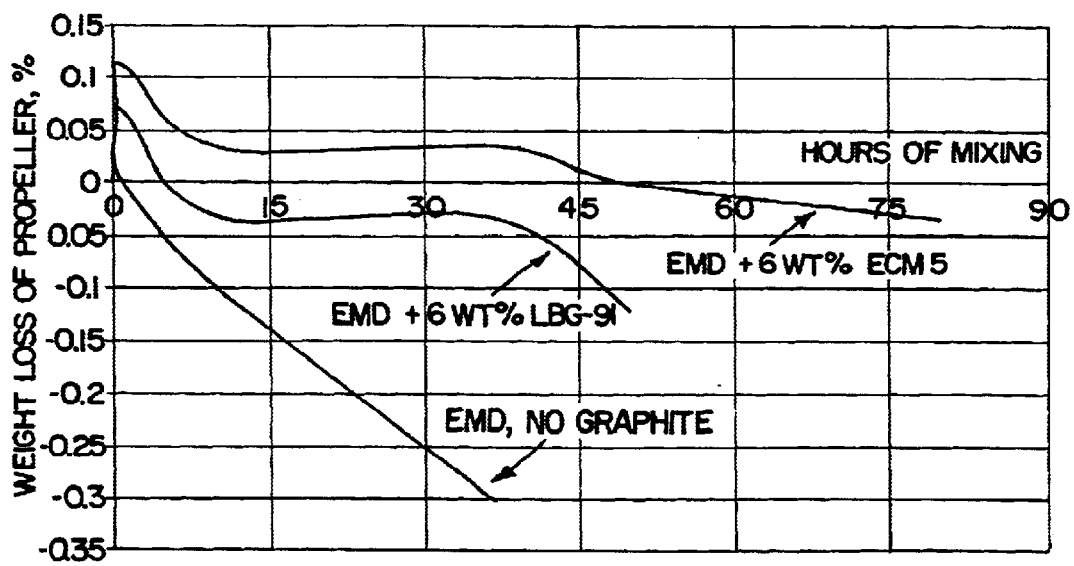
FIG. 4 is a graph showing the weight loss for a stainless steel mixing propeller vs. time of mixing for a mix of EMD with various graphite materials according to the present invention.

It is evident from the data of FIG. 4 that enrichment of the expanded graphite LBG-91 with 20 wt % of natural graphite 2939AP results in the significant increase of its lubricious properties. It is believed that this is the result of the "thicker" particles of natural flake graphite (higher La parameter of the crystallographic structure) more readily allowing for sliding of the graphite layers along basal plane axis (Lc parameter of the crystallographic structure).

The presence of 20 wt % of the natural graphite, on the other hand, somewhat reduced the conductivity enhancing properties of graphite material. However, the dilution of the expanded graphite with 20 wt % of natural has been found to result in less than 7% reduction of the battery capacity, when it is discharged in LR 2016 cells at the current density of 100 mA per gram of EMD from the OCV to 0.8 V vs. Zinc electrode. Similarly to the previous examples, this last phenomenon probably has to do with improved "connectivity" aspect of the carbonaceous materials under investigation.

What is claimed is:

1. An engineered carbonaceous material comprising synthetic graphite co-blended with one or more graphite materials selected from the group consisting of natural flake graphite, natural vein graphite, and amorphous graphite and further comprising 0.01 to 20.0 wt % of an electrode active material.

2. An engineered carbonaceous material comprising expanded graphite co-blended with one or more graphite materials selected from the group consisting of natural flake graphite, natural vein graphite, amorphous graphite, and synthetic graphite and further comprising 0.01 to 20.0 wt % of an electrode active material.

3. An engineered carbonaceous material comprising synthetic graphite co-ground with one or more graphite materials selected from the group consisting of natural flake graphite, natural vein graphite, and amorphous graphite and further comprising 0.01 to 20.0 wt % of an electrode active material.

4. An engineered carbonaceous material comprising expanded graphite co-ground with one or more graphite materials selected from the group consisting of natural flake graphite, natural vein graphite, amorphous graphite, and synthetic graphite and further comprising 0.01 to 20.0 wt % of an electrode active material.

5. The material of claims 1, 2, 3, or 4 wherein the carbonaceous material has a purity of between 90.0 and 99.9% C based on LOI.

6. The method of making a material according to claim 1 comprising co-grinding the graphite material and the $MnO_2$.

7. The method of making a material according to claim 2 comprising co-blending the graphite material and the $MnO_2$.

8. An electrochemical cell comprising an electrolyte, a negative electrode and a positive electrode, the positive electrode comprising a mixture including a carbonaceous material as set forth in claims 1, 2, 3, or 4, and further comprising from between and including 92.0–95.2 wt % $MnO_2$.

9. The material of claims 1, 2, 3 or 4 wherein the material comprises between 0.1 and 99.9 wt % synthetic graphite.

10. The material of claims 1, 2, 3, or 4, wherein the carbonaceous material has a particle size between 3 micrometers and 90 micrometers.

11. An engineered carbonaceous material comprising 99.7 wt % expanded natural crystalline flake graphite sized to have a d50 of 25.0 microns and 0.3 wt % electrolytic manganese dioxide sized so that 99.8% is no greater than 45 microns.

12. An electrochemical cell having an electrolyte, a negative electrode and a positive electrode, the positive electrode comprising a mixture including the carbonaceous material set forth in claim 11.

* * * * *